Sept. 23, 1930.       G. H. MALTSBERGER       1,776,695
DEMOUNTABLE RIM FOR PNEUMATIC TIRES
Filed March 31, 1928       2 Sheets-Sheet 1
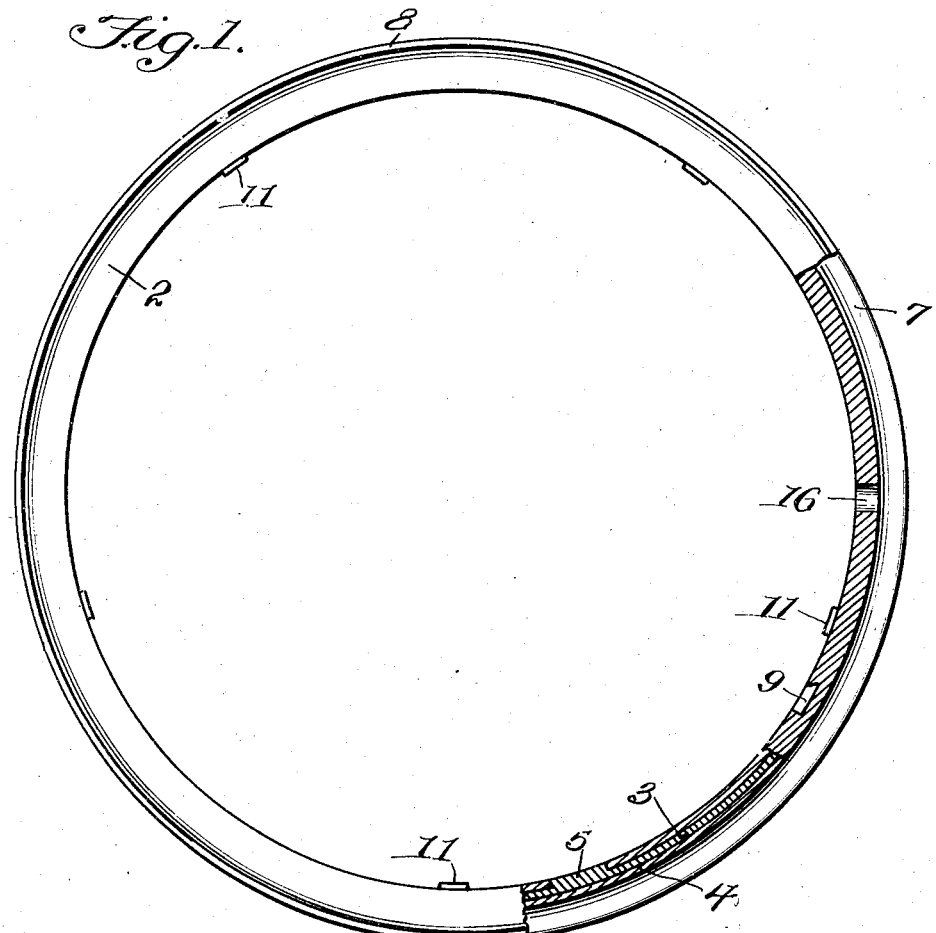
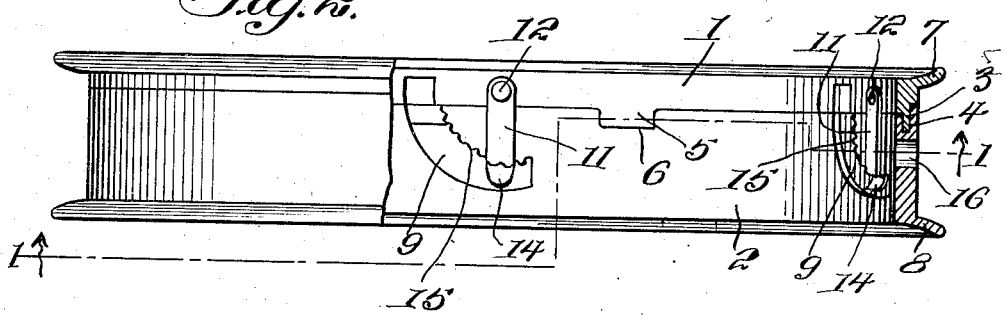
George H. Maltsberger
INVENTOR
WITNESS:
ATTORNEY

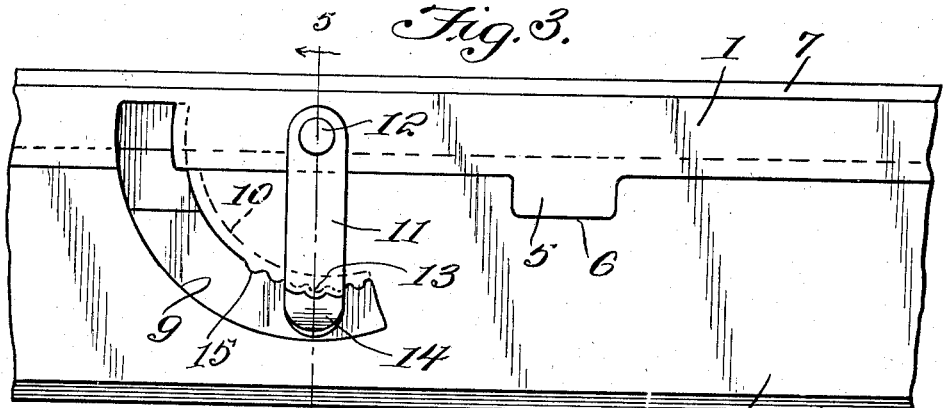
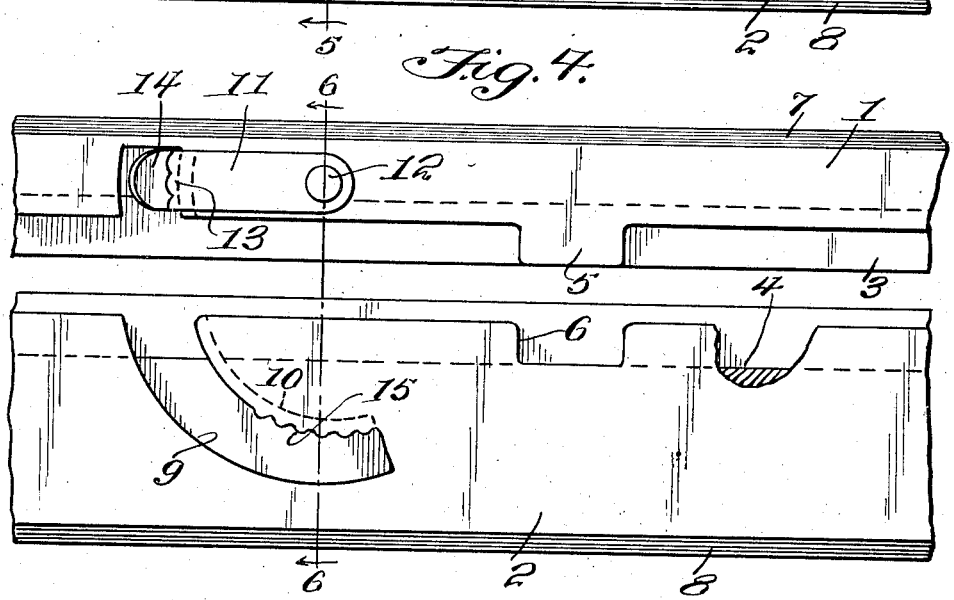
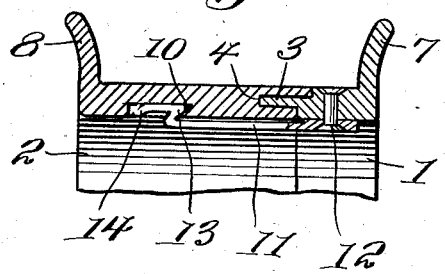
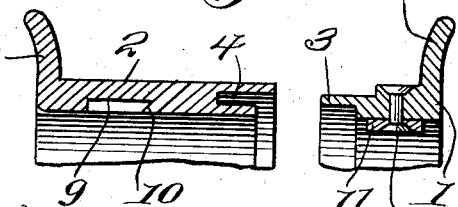

Patented Sept. 23, 1930

1,776,695

UNITED STATES PATENT OFFICE

GEORGE HOWARD MALTSBERGER, OF DE BEQUE, COLORADO

DEMOUNTABLE RIM FOR PNEUMATIC TIRES

Application filed March 31, 1928. Serial No. 266,375.

This invention relates to a demountable rim for a pneumatic tire having for its object to more readily admit the mounting and demounting of a pneumatic tire and to provide simple and inexpensive means for effecting a stable lock of the parts together. In carrying out the invention, I provide two annular rings each with a flange at one edge, having a transverse interlocking tongue and groove joint by which the two parts may be transversely and effectively locked together. On the flanged member, which forms one rim section I form a plurality of pivotal points and in the side wall of the other section an arc shaped groove having an under-cut notched wall, adapted to accommodate a pivoted thin metallic latch adapted to swing over a path over the arc and engage the under-cut groove in a slightly eccentric path so that when the latch is shifted to bring the parts together, it will engage the undercut groove with a cam like action and lock firmly under the notched edge of the groove. A plurality of these latches and cooperating grooves are symmetrically spaced over the face of the rim and when the parts are assembled, the ring forms a very stable support for a pneumatic tire, permitting the tire to be assembled or disassembled very quickly with a minimum effort.

The invention embodies the several structural features above described, which will be hereinafter more fully described and will be definitely indicated in the appended claim.

In the accompanying drawings illustrating the invention:—

Figure 1 is an elevation of a rim embodying my invention partly in section.

Figure 2 is an interior view of the two sections assembled partly in section.

Figure 3 is a similar view to Figure 2 on an enlarged scale, with the demountable sections clamped together.

Figure 4 is a view similar to Figure 3 with the sections disassembled.

Figure 5 is a section on the plane 5—5 of Figure 3.

Figure 6 is a section on the plane 6—6 of Figure 4.

Referring now in detail to the drawings— 1 represents an outer section of my demountable rim and 2 is a wider inner section, the two when closely assembled as indicated in Figure 5 form a firm support for a pneumatic tire. The outer rim section 1 is provided with a circular tongue 3, to cooperate with a similar groove 4, the inner wall being shorter than the outer to snugly fit the tongue which is formed accordingly so that the line of binding strain upon opposite sides of the tongue will be out of alignment, with the result the tongue will be kept in proper shape. The two sections are readily assembled by lugs 5 and recesses 6 symmetrically disposed over the inner periphery of the two sections to render grooves in the sections aligning. The grooves will be presently described. Each of the sections carries a flange 7—8, forming a circular rib at the edge of the rim, which firmly engages the pneumatic tire when distended, and at symmetrical angular positions the two separable sections as illustrated in the drawings are grooved in slightly eccentric arcs, as indicated at 9, the inner wall of these grooves being under cut as indicated at 10, in Figure 5 to cooperate with a spring latch 11 pivoted at 12, in the outer member and having a reversed bent sharp detent to engage the under-cut wall 10 as indicated at 13; this spring arm terminates in a handle 14, by which it may be swung over the arc shaped groove. The edge of the under-cut wall lying in the back of the arm 11, is provided with a plurality of nicks or roughened sections or notches adapted to form an elastic engagement with the detent carried at the end of the spring latch 11. The inner wall of the groove 9 is slightly eccentric with reference to the detent carried by the arm 11, as will be apparent from an examination of Figure 3.

Therefore, when the two parts are brought into alignment and telescoped together a movement of the latches 11 over the grooves 9 will cause the barbed edge of the several arms to ride under the edge of the under-cut notch and form a secure engagement with the notched edge 15 and when the several arms are shifted into such tight engagement the rim will securely lock the pneumatic tire, and when the inner tube thereof is inflated thru the tube stem which is passed thru an opening therefor provided in the outer sectional member of the rim as indicated at 16, the wheel will be in proper running condition. In order to demount it it is a matter of only a few moments to swing the levers 11 out of engagement with cooperating grooves when the front section 7 may be withdrawn and the tire removed.

Having thus described my invention, what I claim is new and desire to secure by Letters Patent is:—

A rim structure comprising a relatively broad rim section provided at its edge with a groove, the outer wall of the groove extending beyond the outer edge of the inner wall of the groove, the inner wall of the groove having a recess entering into the bottom wall of the groove, said section having at its inner surface an arcuate recess the end of which leads in from the edge of the inner wall of the groove, one side edge of the arcuate recess being undercut and notched, a second rim section having at its edge a tongue portion adapted to enter and fill the groove of the first mentioned rim section and with shoulders at the sides thereof adapted to abut the edges of the walls of said groove, the second mentioned rim section having at the side of said tongue a lug adapted to enter and fill the first mentioned recess of the first mentioned rim section and a latch member pivoted to the second mentioned rim section and having a bent portion adapted to enter said arcuate recess and engage under the undercut notched side edge thereof.

In testimony whereof I affix my signature.

GEORGE H. MALTSBERGER.